(12) United States Patent
Chen et al.

(10) Patent No.: US 8,889,051 B2
(45) Date of Patent: Nov. 18, 2014

(54) MOLD AND METHOD FOR INTEGRALLY MANUFACTURING FUNCTIONAL CORED SLAB AND SOLID SLAB WITH POLYGONAL GRID HONEYCOMB STRUCTURE

(75) Inventors: Jinxiang Chen, Nanjing (CN); Zhishen Wu, Nanjing (CN); Gang Wu, Nanjing (CN); Juan Xie, Nanjing (CN); Hong Zhu, Nanjing (CN)

(73) Assignee: Southeast University, Jiangsu (CN)

( * ) Notice: Subject to any disclaimer, the term of this patent is extended or adjusted under 35 U.S.C. 154(b) by 214 days.

(21) Appl. No.: 13/406,441

(22) Filed: Feb. 27, 2012

(65) Prior Publication Data
US 2012/0205836 A1 Aug. 16, 2012

Related U.S. Application Data

(63) Continuation-in-part of application No. PCT/CN2011/070887, filed on Feb. 9, 2011.

(30) Foreign Application Priority Data

Feb. 11, 2010 (CN) .......................... 2010 1 0110069
Jul. 15, 2010 (CN) .......................... 2010 1 0228680

(51) Int. Cl.
*B29C 33/52* (2006.01)
*B29C 45/44* (2006.01)
*B29C 33/30* (2006.01)
*B29L 31/60* (2006.01)

(52) U.S. Cl.
CPC ............. *B29C 33/52* (2013.01); *B29C 45/4457* (2013.01); *B29C 33/302* (2013.01); *B29L 2031/608* (2013.01); *Y10S 425/012* (2013.01)
USPC ........... 264/313; 264/317; 264/318; 425/468; 425/DIG. 12

(58) Field of Classification Search
CPC .......................... B29C 33/52; B29C 45/4457
USPC ............ 264/313, 317, 318; 425/468, DIG. 12
See application file for complete search history.

(56) References Cited

U.S. PATENT DOCUMENTS 3,290,421 A * 12/1966 Miller, Jr. ...................... 264/219
3,520,668 A * 7/1970 Keefer ............................. 65/23
(Continued)

FOREIGN PATENT DOCUMENTS

CN 1539632 A 10/2004
CN 101797783 A 8/2010
(Continued)

OTHER PUBLICATIONS

International Search Report, dated May 12, 2011, corresponding to PCT/CN2011/070887, 6 pages.

*Primary Examiner* — Jill Heitbrink
(74) *Attorney, Agent, or Firm* — Christie, Parker & Hale, LLP

(57) ABSTRACT

A mold and a method for integrally manufacturing a functional cored slab and a solid slab with a polygonal grid honeycomb structure. The mold for manufacturing the cored slab comprises a female mold and multiple male molds which are provided in the female mold. The male molds include polygonal cylinders capable of melting, dissolving, or vaporizing. A clearance exists between at least one pair of adjacent polygonal cylinders. The mold for manufacturing the solid slab is provided with a male mold main-body of polygonal cylinders which share the same shape and amount as the polygonal grids. The male mold main-body, which is made of one of the functional materials including sound insulating materials, flame retardant materials, and thermal insulating materials, is located in the frame-like female mold having a bottom plate. Clearances are provided between the adjacent male mold bodies. A casting method is adopted when manufacturing the slabs.

7 Claims, 11 Drawing Sheets

(56) References Cited

U.S. PATENT DOCUMENTS

| | | | | |
|---|---|---|---|---|
| 3,848,040 A | * | 11/1974 | Confer et al. | 264/86 |
| 4,297,308 A | * | 10/1981 | Popplewell | 264/46.6 |
| 4,891,175 A | * | 1/1990 | Haines | 264/154 |
| 4,975,225 A | * | 12/1990 | Vivaldi et al. | 264/28 |
| 5,176,864 A | * | 1/1993 | Bates et al. | 264/137 |
| 6,350,337 B1 | * | 2/2002 | Nakamura | 156/155 |

FOREIGN PATENT DOCUMENTS

| | | |
|---|---|---|
| CN | 101885217 A | 11/2010 |
| JP | 56-104024 | 8/1981 |
| JP | 2001-162692 | 6/2001 |

\* cited by examiner

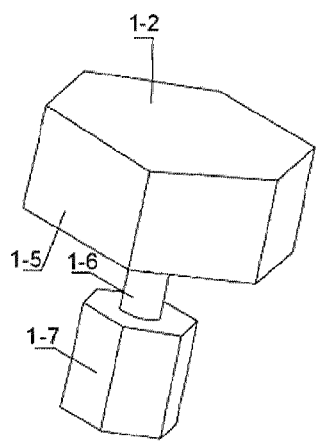 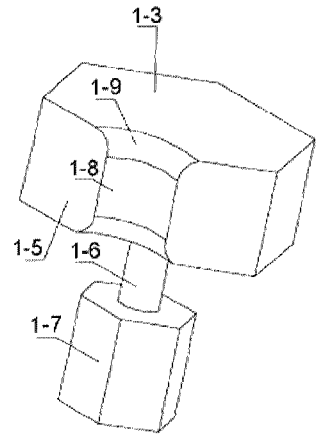 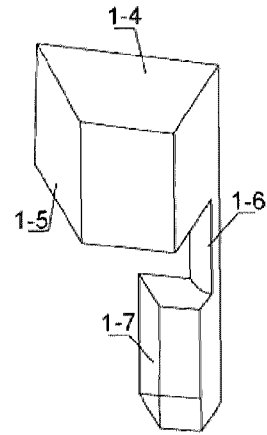
FIG.3　　　　　　　FIG.4　　　　　　　FIG.5
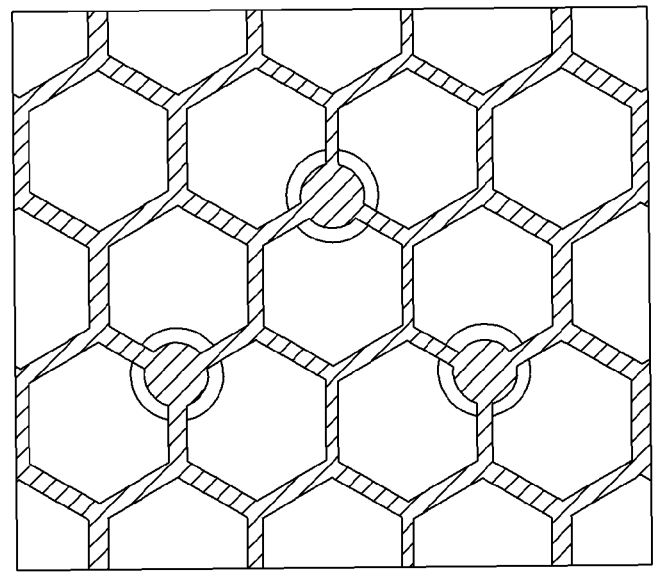
FIG.6

MOLD AND METHOD FOR INTEGRALLY MANUFACTURING FUNCTIONAL CORED SLAB AND SOLID SLAB WITH POLYGONAL GRID HONEYCOMB STRUCTURE

CROSS-REFERENCE TO RELATED APPLICATIONS

This application is a continuation-in-part of International Patent Application No. PCT/CN2011/070887, filed Feb. 9, 2011, which claims priority to and the benefit of Chinese Patent Application No. 201010110069.1, filed Feb. 11, 2010, and Chinese Patent Application No. 201010228680.4, filed Jul. 15, 2010, the disclosures of which are incorporated herein by reference.

FIELD OF THE INVENTION

The present invention relates to a method for manufacturing slabs with a sandwich layer formed by polygonal-grid (honeycomb structure), in particular to a mold and a method for integrally manufacturing functional cored slab and solid slab with polygonal-grid honeycomb structure.

BACKGROUND OF THE INVENTION

Through bionic research on the wings of insects (e.g., beetles), in the view of material mechanics, a sandwich reinforced slab with polygonal-grid in the sandwich layer was developed (Patent No. ZL.03116503.6). The structure of the slab comprises a top layer, a bottom layer, and a sandwich layer. Wherein, the sandwich layer is a core layer formed by polygonal-grid (typically a honeycomb core), with reinforcing columns arranged along the intersections between grid walls. The objective of design diversification can be attained by changing the quantity and distribution of the columns and the shape of the polygons. The reinforced slabs in such structure have much higher compression strength, torsion strength, and peeling strength, and therefore can be widely used in packaging, building, and aerospace fields.

If the reinforced slabs are produced through the conventional process for honeycomb core structure slabs, then they have to be formed by molding the honeycomb core layer separately, and then assembling the honeycomb core layer with the top plate and the bottom plate by bonding or inlaying, in other words, with the conventional method, there is no integrated process to produce polygonal-grid slabs with a honeycomb core layer. Therefore following description provides a mold and a method for integrally manufacturing polygonal-grid hollow core slabs, wherein, the polygonal-grid hollow core slabs are produced with a female mold, a male mold, and "pouring" methods through solidification and mold stripping procedures.

SUMMARY OF THE INVENTION

Technical Problem

The objective of the present invention is to provide a mold and a method for integrally manufacturing polygonal-grid honeycomb hollow core and solid core functional slabs, for purposes of expanding the application of polygonal-grid reinforced sandwich slabs, wherein, some functional materials, such as sound insulating materials, flame retardant materials, thermal insulating materials, and intelligent materials, etc., are filled into the grid spaces in order to form polygonal-grid hollow core and solid core functional slabs.

Technical Solution

The mold for integrally manufacturing polygonal-grid hollow core slabs comprises a female mold and a plurality of male molds that are arranged on the female mold, wherein, said male molds include polygonal columns capable of melting, dissolving, or vaporizing, and a clearance exists between at least a pair of adjacent polygonal columns.

Positioning holes are arranged on the female mold, and positioning columns are arranged on the polygonal columns, wherein said positioning columns are inserted into the positioning holes on the female mold.

Linking columns are arranged between the polygonal columns and the positioning columns, wherein, one end of the linking column is connected to the polygonal column, and the other end of the linking column is connected to the positioning column; the polygonal column is made of paraffin wax and is in the shape of a regular hexagonal prism; the cross sectional circumcircles of the positioning column, the linking column, and the polygonal column are concentric; and arc grooves are arranged on at least one edge of at least one polygonal column.

Arc grooves are arranged on the edges of three adjacent polygonal columns, and three arc grooves are assembled together to form a round hole.

The male molds are arranged into an array in the female mold. After the material for the hollow core slab (liquid, powder, or preformed material) is injected or filled into the mold (e.g., the male and female molds) and then solidified, the material in the cavities of said linking column forms the bottom layer of the hollow core slab, the material in the clearances forms the polygonal-grid, and the top layers of the polygonal columns form the top layer of the hollow core slab. The hollow core slab is then stripped off the male molds by heat, vaporization, or addition of a dissolving solution. A backing plate is arranged on the bottom frame of the female mold, a top cover is arranged on the female mold, and both the top surface of the backing plate and the bottom surface of the top cover are curved surfaces.

A mold and method for integrally manufacturing polygonal-grid honeycomb structure solid core functional slabs is provided, wherein, the mold comprises male molds and a female mold, wherein the male mold bodies are polygonal columns; are in the same shape and quantity as the polygonal-grid; and are positioned in the closed-ended frame-type female mold, with clearances formed between adjacent male mold bodies. Solidified molding material is filled into the female mold by pouring, and after the material is solidified, the female mold is stripped off, so that the clearances between two adjacent male mold bodies form the plates of a polygonal-grid, the cavity between the male mold bodies and the bottom plate of the female mold forms the bottom layer of the polygonal-grid honeycomb structure, and the pouring material covering the male mold bodies forms the top layer of the polygonal-grid honeycomb structure. The male mold bodies employ one of the following positioning structures in the female mold.

(1) Vertical positioning, using one of the following structures:

1) Each male mold body is a separate one, and polygonal positioning holes, that are in the same quantity as a plurality of the male mold bodies, are arranged on the bottom plate of the female mold, wherein the depth of the positioning holes is smaller than the thickness of the bottom plate of the female mold. The process column and positioning column are arranged in sequence below each male mold body, wherein the male mold body, process column, and positioning column are linked together, and the centers of the male mold body, positioning column, and process column are on the same axial line. The positioning column on each male mold body matches the corresponding polygonal positioning hole in the bottom plate of the female mold in shape, and is inserted into the positioning hole; the height of the positioning columns is the same as the depth of corresponding positioning holes; a plurality of male mold bodies are assembled into an array in the frame of the female mold, with clearances formed between adjacent male mold bodies; and after the positioning columns on the male mold bodies are inserted into the female mold, the total height of the male mold body, process column, and positioning column is smaller than the height of the frame of the female mold. The male mold bodies are made of one of the functional materials including sound insulating materials, flame retardant materials, and thermal insulating materials, and the positioning columns and process columns are made of one of the following materials:

a) Fusible material such as paraffin wax, wherein the melting point of the functional material is higher than the melting point of the fusible material;

b) The same material as the male mold bodies, but the polygonal columns are linked to the process columns in a removable manner.

As a pouring material, the solidified molding material is filled into the female mold until the male molds are covered, and once solidified, is stripped off the female mold, wherein, the material in the clearances between adjacent male mold bodies form the plates of a polygonal-grid; the cavities between linking columns of each male mold and the linking columns of adjacent male molds form the bottom layer of the solid core functional slab, and the height of the linking columns has the same thickness as that of the bottom layer; and after the pouring material covers the male mold bodies, it forms the thickness of the top layer of the solid core functional slab; wherein, in the structure described in a), the molded piece is heated after mold stripping, so that the positioning columns and process columns that are left in the molded piece flow off; and in the structure described in b), the positioning columns and process columns that are left in the molded piece are removed after mold stripping.

2) Each adjacent male mold body is cross-linked together to form an integrated male mold body. Positioning support points, in a minimum quantity enough to meet balanced supporting requirements, are selected on the integrated male mold body, and these positioning support points are selected on the separate male mold bodies. Cylindrical positioning holes are arranged on the bottom plate of the female mold and the separate male mold bodies corresponding to these cylindrical positioning holes are in the same structure as the separate male mold bodies described in 1), with the only difference being that the positioning columns are designed into cylindrical columns that match the cylindrical positioning holes in the female mold. The pouring molding method is the same as the method described in 1).

3) Some male mold bodies are cross-linked together to form an integrated male mold block, and a plurality of integrated male mold blocks are assembled into an integrated male mold body. The integrated male mold blocks are positioned in the same way as that described in 2), and the pouring molding method is the same as the method described in 1) and 2).

(2) Horizontal positioning:

Each separate male mold body is cross-linked into an integrated male mold body. Ribs are arranged on the sides of the integrated male mold body, and grooves are arranged on the corresponding position of the frame of the female mold; and the integrated male mold body is positioned and supported in the corresponding grooves of the frame of the female mold by means of the ribs. The depth of the grooves is set appropriately, so as to control the distance from the bottom of the male mold to the bottom plate of the female mold, and thereby control the thickness of the bottom layer of the solid core functional slab.

(3) Mixing positioning:

Some male mold bodies are positioned horizontally, while other male mold bodies are positioned vertically.

The male mold bodies are regular hexagonal prisms, and a via hole is arranged at the center of the regular triangle enclosed by the connecting lines through the centers of every three adjacent regular hexagonal prisms, wherein, the corresponding edge of each of the three adjacent regular hexagonal prisms is designed with an arc groove surface. A reinforcing column is formed in the space among the grids after the molding material is poured and solidified.

The extension of at least one reinforcing column is used as a vertical positioning column and is fitted to the corresponding positioning hole on the bottom plate of the female mold. In such a positioning scheme, the male mold body must be an integrated male mold structure or a structure assembled from integrated male mold blocks.

Beneficial Effects

In the present invention, with a light-weight and high-tensile skeleton and an integrated manufacture method, by embedding or packing a special functional material having sound insulating, and/or flame retardant, and/or heat insulating, and/or other special features into the cavities of the polygonal-grid (typically in a honeycomb structure), a solid core functional slab is produced, having not only the advantages and efficacies of the patent described above, but also having special functions such as sound insulation, flame retardation, and heat insulation. The present invention not only inherits the advantages of the two inventions described above, such as energy conservation and environmental protection, but also delivers favorable social benefits. In addition, since the slab in the present invention has special functions, it can improve the techniques of existing honeycomb slabs, can be used more widely, and can effectively increase economic benefit.

The polygonal-grid honeycomb structure hollow core functional slab in the present invention has a clear structure, is suitable for commercial production, and can be used to obtain light-weight and high-tensile bionic construction in general. Therefore, the present invention is an effective approach for increasing economic benefit by improving the techniques of existing honeycomb slabs. In addition, the novel hollow "honeycomb-column" polygonal-grid slab can be used more widely. And therefore it can bring high economic benefit.

BRIEF DESCRIPTION OF THE DRAWINGS

FIGS. 3-5 are schematic structural diagrams of the three kinds of the male molds shown in FIG. 1;

FIG. 6 is a sectional view of the hollow core slab manufactured in embodiment 2 in the present invention;

DETAILED DESCRIPTION OF THE EMBODIMENTS

Figure 1:
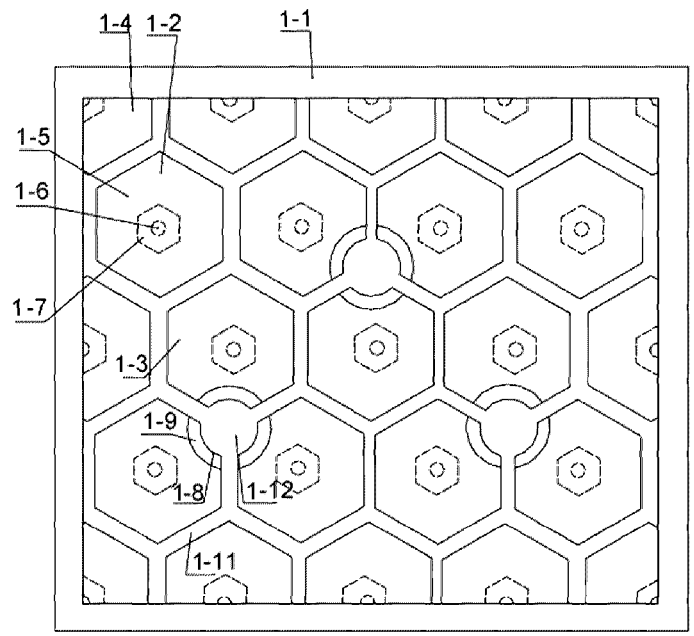
FIG. 1 is a schematic structural diagram of the mold in embodiment 1 in the present invention.

The mold for integrally manufacturing the polygonal-grid hollow core slab in the present invention comprises: a female mold 1-1 and a plurality of male molds that are arranged on the female mold 1-1, wherein the male molds include polygonal columns 1-5 capable of melting, dissolving, or vaporizing, with clearances between at least one pair of adjacent polygonal columns 1-5. In this embodiment, positioning holes 1-10 are arranged on the female mold 1-1, positioning columns 1-7 are arranged on the polygonal columns 1-5, and the positioning columns 1-7 are inserted into the positioning holes 1-10 on the female mold 1-1. Linking columns 1-6 are arranged between the polygonal columns 1-5 and the positioning columns 1-7, one end of the linking columns 1-6 is connected to the polygonal columns 1-5, and the other end of the linking columns 1-6 is connected to the positioning columns 1-7. The polygonal columns 1-5 are made of paraffin wax and are regular hexagonal prisms. The circumcircles of cross sections of the positioning column 1-7, linking column 1-6, and polygonal column 1-5 are concentric. Arc grooves 1-8 may be arranged on at least one edge of at least one polygonal column 1-5, however, in this embodiment, arc grooves 1-8 are arranged on the edges of three adjacent polygonal columns 1-5, and the three arc grooves 1-8 can be assembled together to form round holes 1-12. The male molds are aligned into an array in the female mold 1-1.

A backing plate is arranged on the bottom frame of the female mold 1-1, a top cover is arranged on the female mold 1-1, and both the top surface of the backing plate and the bottom surface of the top cover are curved surfaces.

In another embodiment of the present invention, a method for integrally manufacturing polygonal-grid hollow core slabs with the mold described above is provided, wherein the liquid raw material for hollow core slabs is filled into the mold and then solidified, the cavities of the linking columns 1-6 form the bottom layer of the hollow core slab, the clearances 1-11 form the polygonal-grid, and the top layer of the polygonal columns 1-5 forms the top layer of the hollow core slab; then, the hollow core slab is stripped off the male molds by heat, vaporization, or addition of a dissolving solution.

Hereunder the technical scheme of the present invention will be further detailed.

Provided is a mold for integrally manufacturing polygonal-grid hollow core slabs, comprising a plurality of male molds and a female mold, wherein, the male molds themselves have to be formed or produced with a special associated mold (associated female mold), and are each usually assembled into integrated pieces. According to the functionality, the male mold can comprise three parts, i.e., a polygonal column, a positioning column, and a linking column (also used as a drain port). The polygonal column and positioning column are located at the upper end and lower end respectively, and the linking column links the polygonal column and the positioning column. The male mold is made of fusible, soluble, or vaporizable material. The female mold is a frame type, with positioning holes for the male molds arranged on the bottom plate of the female mold. The male molds can be positioned by inserting the positioning columns into the positioning holes. Polygonal columns on the plurality of male molds are assembled with each other, and clearances are left among the polygonal columns for forming a grid. Arc grooves are arranged at zero, one, or more corners of the polygonal columns on each male mold.

Preferably, the polygonal columns are regular hexagonal prisms. The regular hexagonal prisms are used to produce honeycomb core slabs.

Preferably, the polygonal columns are regular hexagonal prisms, and arc grooves are arranged at one or more corners of the polygonal columns (hereinafter the polygonal columns are abbreviated as "grooved prisms"). The grooved prisms are used to produce the bionic structure "honeycomb-column" hollow core slabs.

Preferably, arc grooves are arranged at the corners of the three adjacent polygonal columns respectively, and the three arc grooves can be assembled together to form a connecting hole. The connecting holes will form columns on the polygonal-grid after the molding.

Preferably, the positioning column on the male mold is also a regular hexagonal prism, one linking column is arranged on the male mold, and the linking column is in either a cylindrical shape, a regular hexagonal prism shape, or other regular shape. The circumcircles of cross sections of the positioning column, linking column, and polygonal column are concentric, to facilitate positioning when the polygons are assembled.

Preferably, a backing plate is arranged on the bottom frame of the female mold. After the male molds are fitted to the female mold, a top cover is placed above the male molds at an appropriate elevation, so as to control the thickness of the top layer and the bottom layer, and accordingly, a controller for controlling the elevation of the top cover is arranged on the female mold. Several raw material inlets are arranged on the top cover.

Preferably, the arc grooves have arc chamfers on one or two sides between the top layer and the bottom layer.

Preferably, the male mold is molded by paraffin wax. Since the melting point of paraffin wax is low, the paraffin wax can be easily removed by heating after the mold is formed.

As a further improvement, the polygonal column, positioning column, and linking column on the male mold can be separate columns, and can be assembled together.

As a further improvement, if the polygonal column is large, then it comprises two or more pairs of positioning columns and linking columns. When a polygonal column comprises (or consists of) three pairs of positioning columns and linking columns, the three linking columns are not in the same line.

As a further improvement, either the polygonal columns which are arranged at an edge of the female mold have to be cut appropriately to match the shape of the edge, or only the required part of the male mold has to be machined. Usually, one half or one quarter of the male mold can be left by vertical cutting; thus, molds in different sizes with different edge shapes can be obtained as required, in order to produce polygonal-grid hollow core slabs.

As a further improvement, the female mold can be rectangular shape, round shape, or any other shape as required. In this case, either the polygonal columns which are arranged at an edge of the female mold have to be cut appropriately to match the shape of the edge, or only the required part of the male mold has to be machined.

As a further improvement, a large square or rectangular slab can be produced, and then the large slab can be cut into slabs in an appropriate shape, such as round slabs or trapezoid slabs.

As a further improvement, the slab thickness can be controlled by controlling the volume or weight of the material filled into the female mold. In this case, no top cover is required.

As a further improvement, the surface of the bottom frame of the female mold, the top surface of the backing plate, the bottom surface of the top cover, and the top surface and bottom surface of the male mold are curved surfaces, so that polygonal-grid hollow core slabs with curved surfaces can be produced.

As a special case, there could be no clearance between polygonal columns and some adjacent male molds.

A method for production of hollow core slabs is provided in another embodiment of the present invention. The technical scheme is:

A method for integrally manufacturing polygonal-grid hollow core slabs, wherein, the mold described in the above technical schemes is employed, and the liquid material for producing hollow core slabs is filled into the mold and solidified, so that the cavities of the linking columns form the bottom layer of the hollow core slab, the clearances form the regular polygonal-grid, the regular hexagonal prisms form the top layer of the hollow core slab, and the arc grooves form the columns. After the female mold is stripped off, a solid core slab is then directly obtained. Next, the male molds in the hollow core slab are removed by heat, vaporization, or addition of a dissolving solution, and thereby a regular polygonal-grid hollow core slab, or polygonal-grid hollow core slab that contains the columns, is obtained. Preferably, the polygonal columns are regular hexagonal prisms.

With the technical scheme described above, that is, through liquid solidification and molding, composite material embedding and molding, and powder material embedding, solidification, and molding, polygonal-grid hollow core slabs in different sizes can be manufactured in an integrated manner. The method provided in the present invention is very simple and successfully overcomes the drawback in the prior art for manufacturing honeycomb slabs (typically polygonal-grid hollow core slabs), wherein, the top/bottom layer and the core layer have to be assembled by bonding or inlaying. In this present invention, since no bonding agent is required between the top/bottom layer and the core layer, the safety and environmental problems brought on by the use of bonding agents are eliminated. In addition, since the slabs are typically hollow and light-weight, a great deal of resources can be saved. Therefore, the slabs produced with the mold disclosed in the present invention have a low carbon feature, are environmentally-friendly products, and bring favorable social benefits.

Furthermore, the molding process disclosed in the present invention can be used to manufacture hollow polygonal-grid slabs having a honeycomb or "honeycomb-column" sandwich structure. The honeycomb structure has been widely applied, and the "honeycomb-column" sandwich structure is a typical biologically optimized type of honeycomb structure. Slabs having a honeycomb or "honey-comb" sandwich structure have been proven to have excellent mechanical properties. Compared to existing honeycomb slabs produced through the conventional bonding or inlaying process in the prior art, the hollow honeycomb or "honeycomb-column" polygonal-grid slabs manufactured with the mold and method disclosed in the present invention have an integral structure, and therefore have better mechanical properties. As such, these slabs are beneficial to all application fields related with honeycomb structure.

Hereunder the embodiments of the present invention will be detailed, with reference to the accompanying drawings.

Embodiment 1

Mold Combination

FIG. 1 shows a mold for integrally manufacturing "honeycomb-column" (regular hexagonal grid) hollow core slabs. The mold comprises male molds 1-2 and 1-3, and a female mold 1-1, wherein, the male molds 1-2 and 1-3 comprise polygonal columns 1-5, positioning columns 1-7, and linking columns 1-6, respectively; the polygonal columns 1-5, positioning columns 1-7, and linking columns 1-6 are made of paraffin wax by integrated molding; the polygonal columns 1-5 and positioning columns 1-7 are located at the top end and bottom end, respectively, of the linking columns 1-6, and the linking columns 1-6 connect the polygonal columns 1-5 and positioning columns 1-7; the polygonal columns 1-5 and positioning columns 1-7 are regular hexagonal prisms, and the linking columns 1-6 are cylinders; and the circumcircles of cross sections of the positioning columns 1-7, linking columns 1-6, and polygonal columns 1-5 are concentric. As shown in FIGS. 3-5, if the male molds 1-2 and 1-3 are arranged at the edges of the female mold, either the male molds have to be cut appropriately to match the shape of the edge, or only the required part of male mold has to be machined. For example, if the male mold is similar to that at the top left corner in FIG. 1, then only a quarter of the male mold similar to that shown in FIG. 5, is required. With similar methods, a variety of mold assemblies in different sizes can be obtained to manufacture regular hexagonal grid hollow core slabs, so as to obtain various slabs as required.

Figure 2:
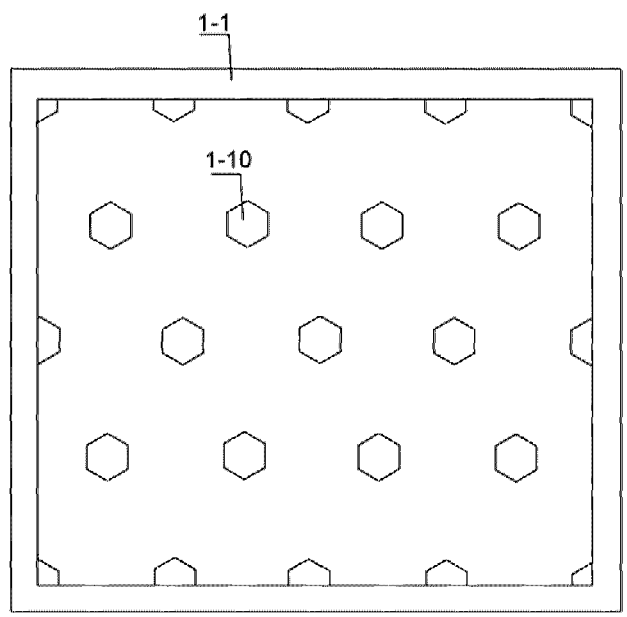
FIG. 2 is a schematic structural diagram of the mold shown in FIG. 1.
Figure 7:
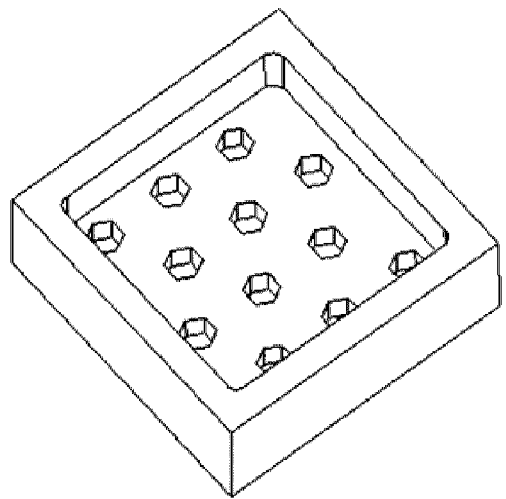
FIG. 7 is a three dimensional structural diagram of the female mold in the present invention.

As shown in FIG. 2, the female mold 1-1 is a frame type, positioning holes 1-10 in the same quantity as the male mold 1-2 are arranged on the bottom plate of the female mold 1-1, and the positioning holes 1-10 match the positioning columns 1-7. The height of the frame of the female mold 1-1 is greater than or equal to the combined sum of the height of the linking columns 1-6, the honeycomb part of the male mold 1-2, and the thickness of the other layer of the slab. A series of backing plates can be arranged on the bottom frame of the female mold 1-1, and the backing plates match the female mold in size. The thickness of the bottom layer and the total thickness of the slab can be controlled by adjusting the thickness of the backing plates, making the process very flexible. The female mold 1-1 can be provided with or without a top cover. In case a top cover is used and the entire assembly is large, usually a plurality of material inlets are arranged, in other words, a multi-point injection molding method can be used.

As shown in FIG. 1, the male molds are fitted to the female mold by inserting the positioning columns 1-7 into the positioning holes 1-10; a plurality of polygonal columns 1-5 are assembled side by side, with clearances 1-11 formed between the polygonal columns 1-5. Through arc grooves 1-8 are arranged at the corners of the polygonal columns 1-5 on the male mold 1-2, and the arc grooves 1-8 run to the upper part and lower part via the arc grooves 1-9, respectively; arc grooves 1-8 are arranged at the corners of three adjacent polygonal columns 1-5, and the three arc grooves 1-8 are assembled together to form connecting holes 1-12. In the mold assembly, three connecting holes 1-12 are arranged, and therefore three small columns can be formed after molding.

Embodiment 2

Figure 18:
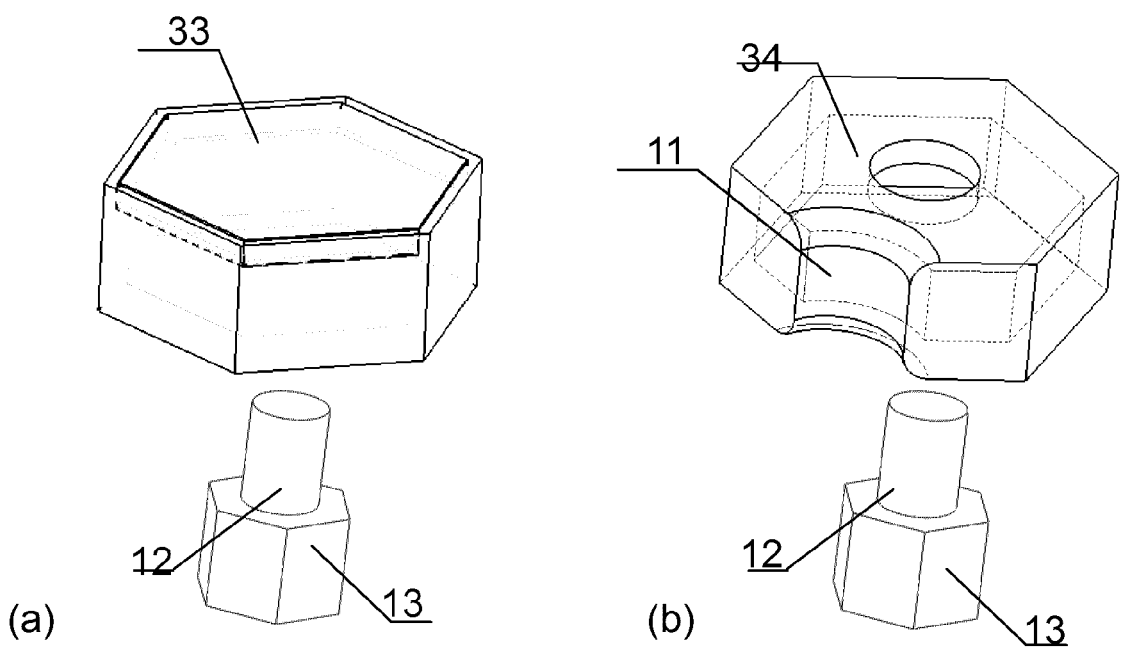
FIG. 18 is a schematic structural diagram of the male mold with hollow polygonal columns.

A method for integrally manufacturing polygonal-grid hollow core slabs, wherein, the mold described in embodiment 1 is employed, the material for producing hollow core slabs (e.g., mixture of resin and chopped basalt fibers) is filled into the mold and solidified, so that the cavities of the linking columns 1-6 form the bottom layer of the hollow core slab, the clearances 1-11 form the honeycomb grids, the connecting holes 1-12 form reinforcing columns for the honeycomb grids, and the top layer of the polygonal columns 1-5 forms the top layer of the hollow core slab; the molded piece that contains the male molds is stripped off the female mold; and then the male molds 1-2 are removed by heating up the polygonal columns 1-5, the positioning columns 1-7, and the linking columns 1-6. As a result, a hollow core slab with a cross section as shown in FIG. 18 is obtained, that is, a novel bionic hollow "honeycomb-column" core slab is obtained.

Figure 8:
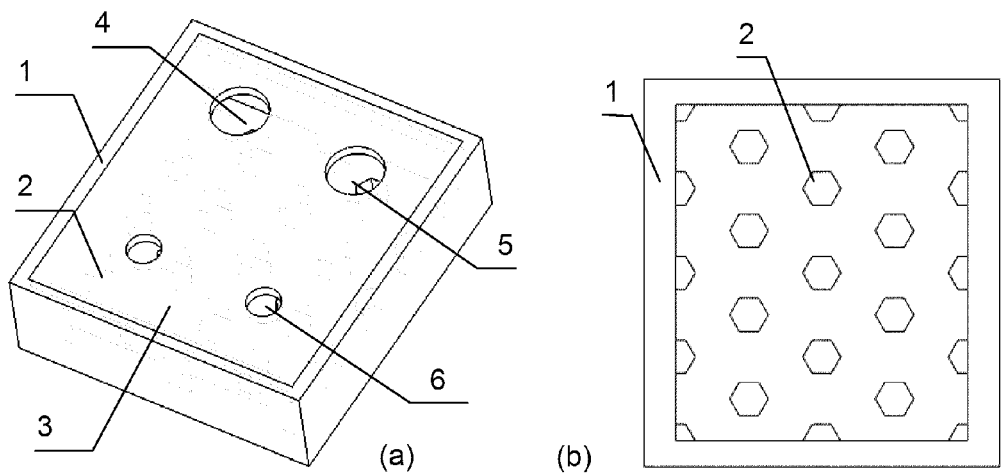
FIG. 8 is a schematic structural diagram of the female mold: (a) perspective view, and (b) top view (without top cover)
Figure 9:
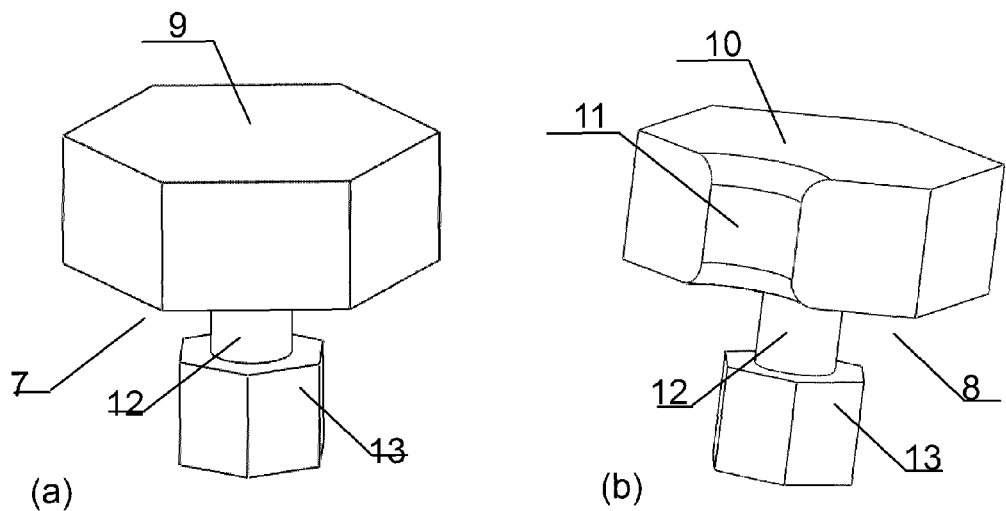
FIG. 9 is a schematic structural diagram of two general types of male molds: (a) simple polygonal columns, and (b) polygonal columns with grooves.

FIG. 1 and FIG. 2 show the structures of a female mold and a male mold that are positioned vertically; wherein, FIG. 8(b) shows a closed ended frame-type female mold without top cover; the item 1 is the border frame of the female mold and is higher than the male mold; and the item 2 is a hexagonal positioning hole (blind hole, in depth smaller than the thickness of the bottom plate) arranged at the bottom plate, into which the positioning column 13 on the male mold shown in FIG. 9 can be inserted. After the positioning column 13 is inserted into the hexagonal positioning hole 2, the bottom of the positioning column 13 is flush with the top surface of the bottom plate of the female mold. The linking column 12 connects the hexagonal columns (i.e., male mold bodies) 9 and 10 with the positioning column 13 to form an integrated male mold, wherein, the hexagonal columns 9 and 10 are made of functional materials having sound insulating, and/or flame retardant, and/or heat insulating, and/or intelligent features, etc.; the linking column 12 and positioning column 13 are made of a fusible material (e.g., paraffin wax); and the melting point of the functional material is higher than the melting point of the fusible material. After the male molds which are in the same quantity as the positioning holes on the female mold are positioned, (the dimensions of the molds are designed in a way that appropriate clearances are formed between the hexagonal columns 9 or 10 of adjacent male molds), the solidified molding material (e.g., epoxy resin) is poured into the female mold. After the female mold is stripped off (e.g., the borders of the female mold can be removed), the linking columns 12 are molded into the bottom layer of the solid core honeycomb functional slab, the resin material that covers the male molds forms the top slab of the solid core honeycomb functional slab, and the clearances between the hexagonal columns 9 of adjacent male molds form the plates of honeycomb grids. Then, the molded piece is heated up, so that the paraffin wax flows off the functional slab. FIG. 1(a) shows a female mold with a top cover, wherein the female mold has one or more inlets 5, and vent holes or suction holes 6.

Two basic male mold structures, which are preferred, are the structures shown in FIG. 9, wherein, FIG. 9(a) shows a simple polygonal column structure, which is entirely labeled as 7; and FIG. 9(b) shows a polygonal column structure with groove 11, which is entirely labeled as 8. In addition, the structure shown in FIG. 9 further comprises a process column 12 and a positioning column 13.

Figure 10:
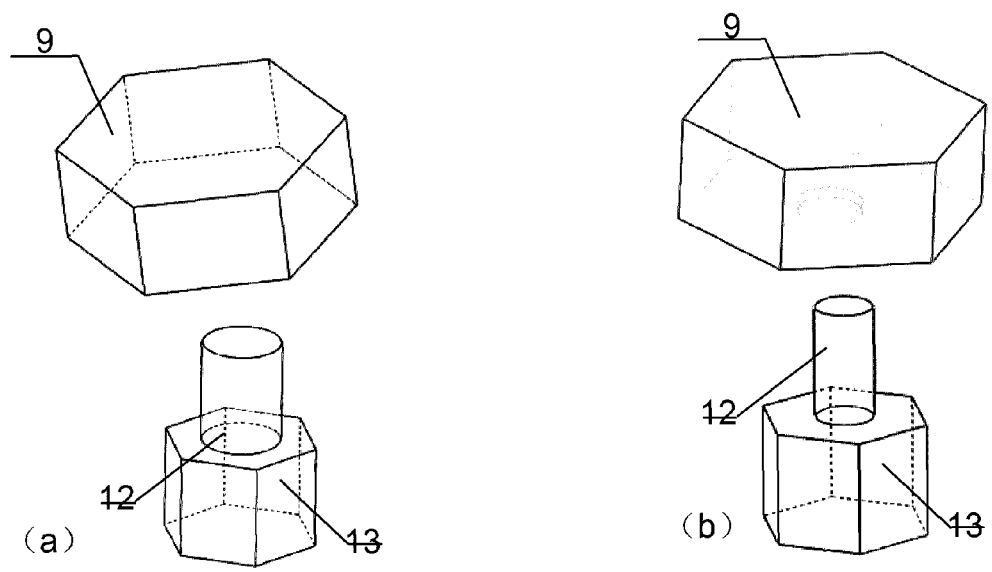
FIG. 10 is a schematic structural diagram of two types of optimized process columns and positioning columns in the male mold.

As a further improvement, the two types of optimized process column and positioning column structures in the male mold, are as shown in FIG. 10. In this case, the polygonal column is a separate part, and the process column and positioning column are produced into an integrated structure. Wherein, in FIG. 10(a), a material that is fusible, soluble, vaporizable, or easy to mold, such as paraffin wax, is molten and attached to the middle part below polygonal columns with an appropriate mold. The structure shown in FIG. 10(b) can be designed into a concave-convex structure, and can be connected to the polygonal column structure temporarily by inlaying.

Figure 11:
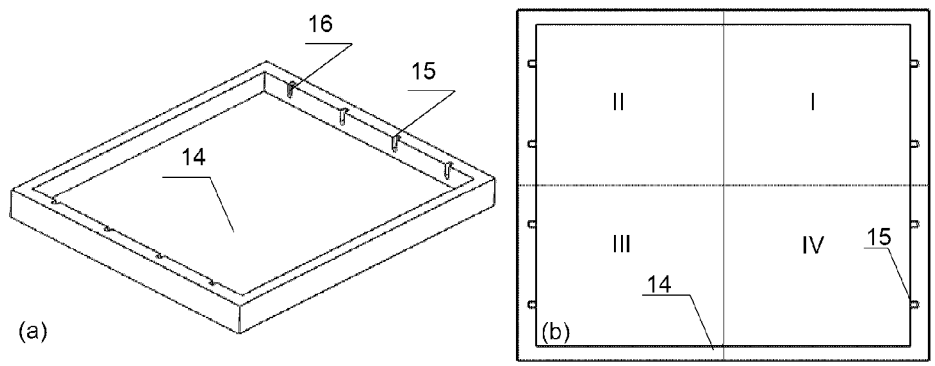
FIG. 11 is a schematic structural diagram of the female mold that works with an edge-supported integrated male mold: (a) perspective view, and (b) top view.
Figure 12:
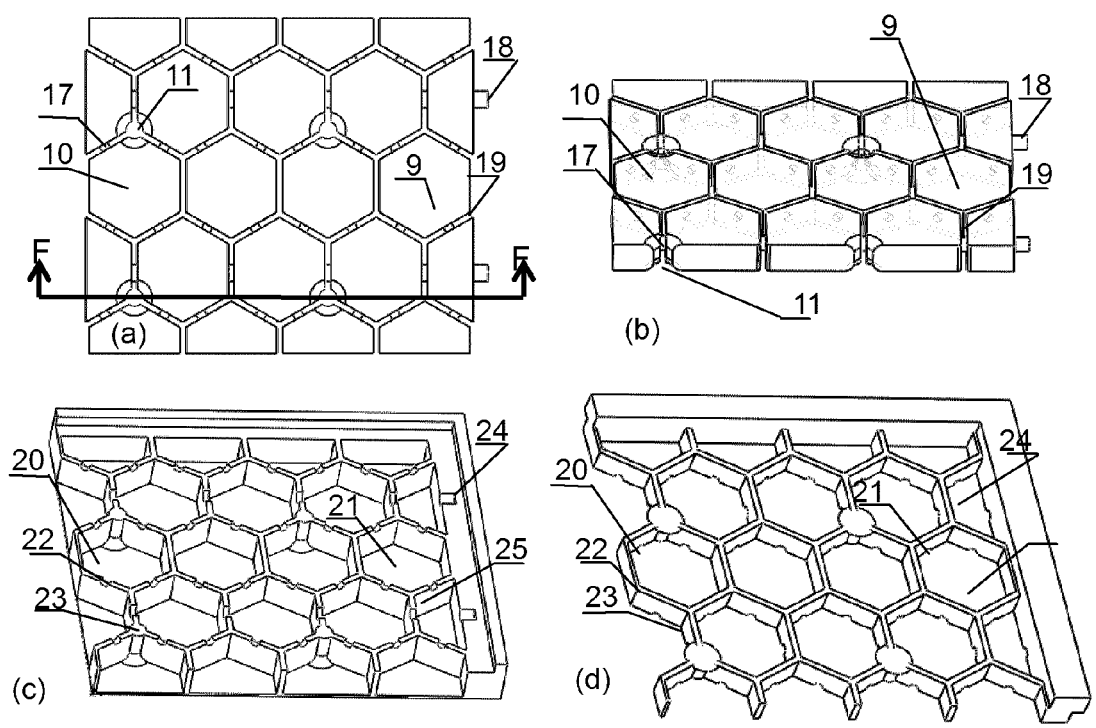
FIG. 12 is a partial structural diagram of the edge-supported integrated male mold: (a) top view, (b) perspective sectional view F-F, (c) perspective view of the lower part of the male mold, and (d) perspective view of the upper part of the male mold.
Figure 13:
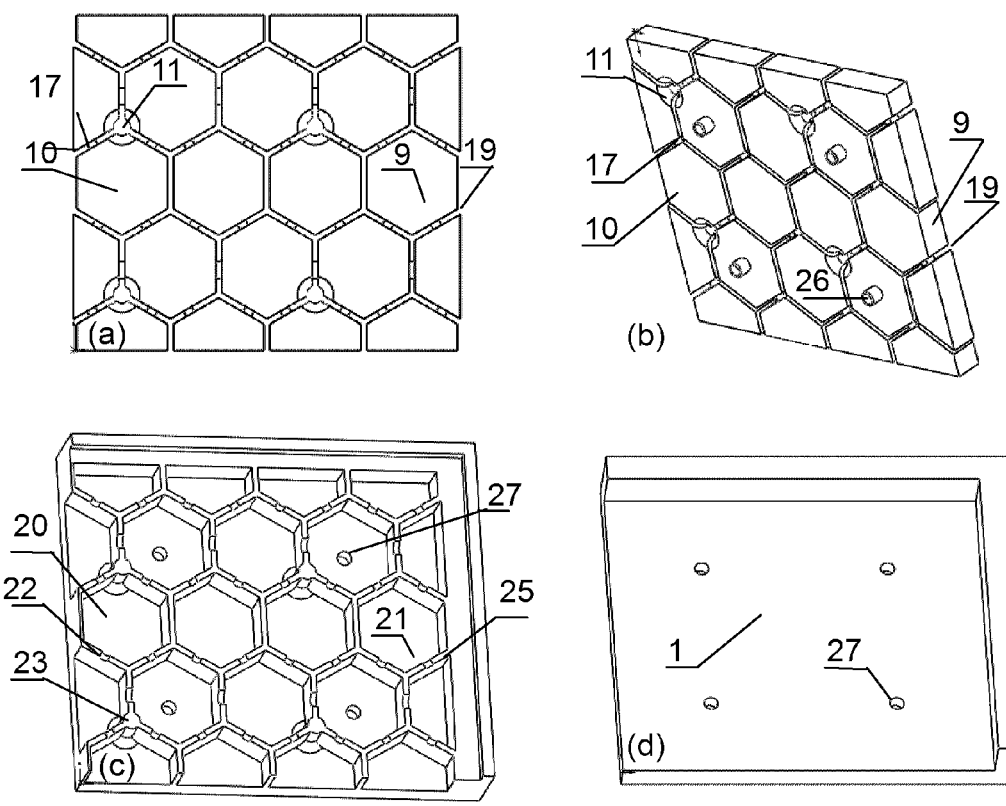
FIG. 13 is a partial structural diagram of an integrated male mold block with bottom support, assembled male mold, and female mold: (a) top view, (b) perspective bottom view, (c) perspective view of male mold, and (d) partial perspective view of the female mold structure.
Figure 14:
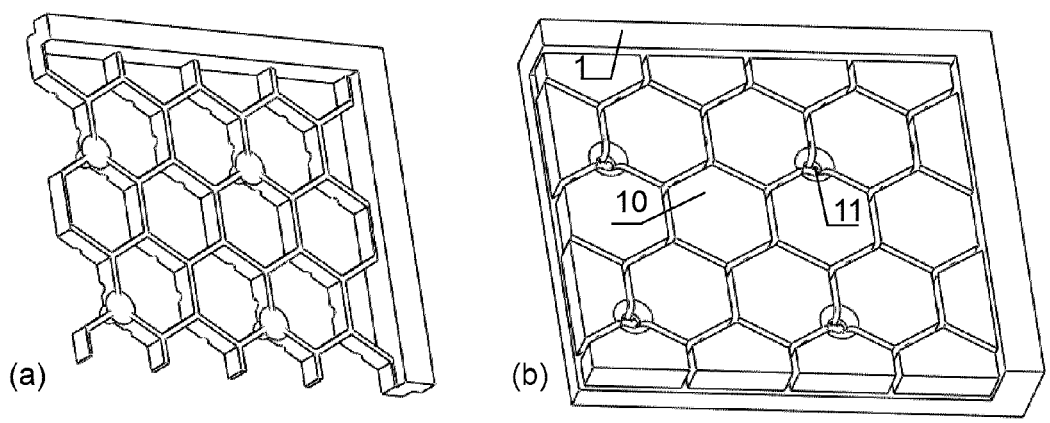
FIG. 14 shows a perspective view of the upper part of the shared male mold and the assembled mold.

As a special case, an integrated male mold is used. The structure of a female mold that works with the male mold is shown in FIG. 11, wherein, positioning holes 15 and closing pieces 16 are arranged on bottom frame 14. For the convenience of presentation, part I is shown to represent a quarter of the structure shown in the top view in FIG. 11(b) (the FIGS. 13-16 also show the part I representing a quarter of the structure). The male mold structure and the mold of the male mold structure are shown in FIG. 12. Here, the original separate male molds are cross-linked via the process columns 17 shown in FIG. 12, and the bottom supports are modified into side supports. Therefore, the process column and positioning column that were originally designed for support, (items 12 and 13 in FIG. 9 and FIG. 10, respectively) are removed, and the positioning column is designed on the polygonal column at the edge (item 18 in FIG. 12). In order to obtain the male mold shown in FIG. 12(a) and FIG. 12(b), the male mold as shown in FIG. 12(c) and FIG. 12(d) can be produced. See the description in embodiment 2 for the implications of the labels in FIG. 12.

For further enhancement, an integrated male mold block is designed; and the structure is shown in FIG. 12. The integrated male mold block comprises a plurality of polygonal columns cross-linked by process columns. Most of the bottom supports are removed, and the bottom supports 26 that are indispensable for stably supporting the male mold block are kept.

In another embodiment, the above-mentioned bottom supports 26 of the integrated male mold block can be removed, and instead, the bottom supports are designed in the columns;

such supports are referred to as "three-leaf supports" 30. FIG. 16(a) is a perspective view of an integrated male mold block supported by three-leaf supports, a male mold (FIG. 16(c)), and a female mold (FIG. 16(d)). As shown in FIG. 16(b), the support column has three ribs; the starting points of the three ribs are flush with the bottom of the polygonal column, and the ribs extend to one half or two thirds of the height of the polygonal column. In addition, the corresponding grooves connected with the ribbed columns are opened on the polygonal column, to implement rib-groove connections.

Figure 17:
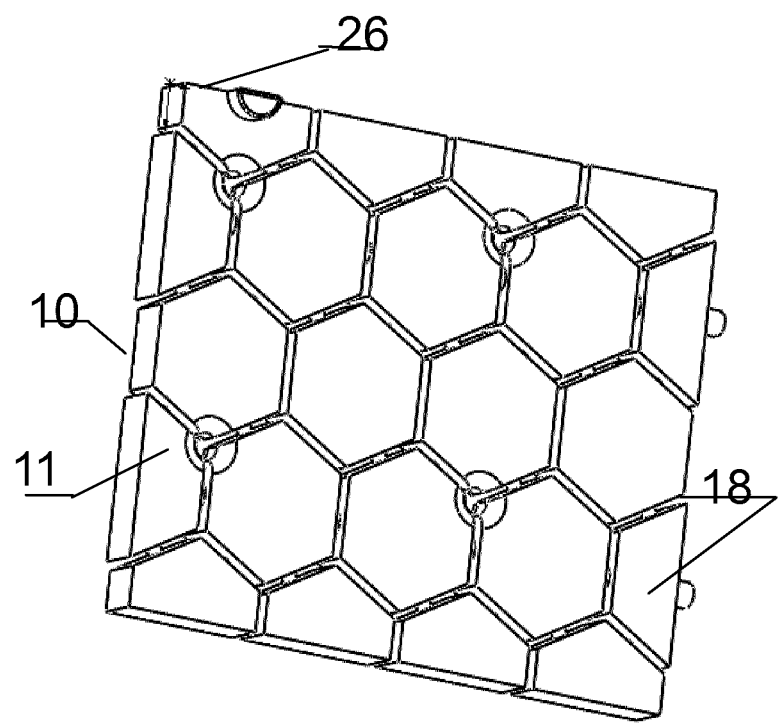
FIG. 17 shows an integrated male mold block supported at the edges and on the bottom (mixed support)

In another embodiment of the mold, an integrated male mold block with bottom supports and side supports is designed; the structure of the integrated male mold block is shown in FIG. 17. Only bottom supports or side supports which are indispensable for stably supporting the male mold are kept.

As a further improvement, and with reference to the forementioned integrated male mold blocks, a male mold comprising a plurality of integrated hollow polygonal column blocks is designed.

Figure 19:
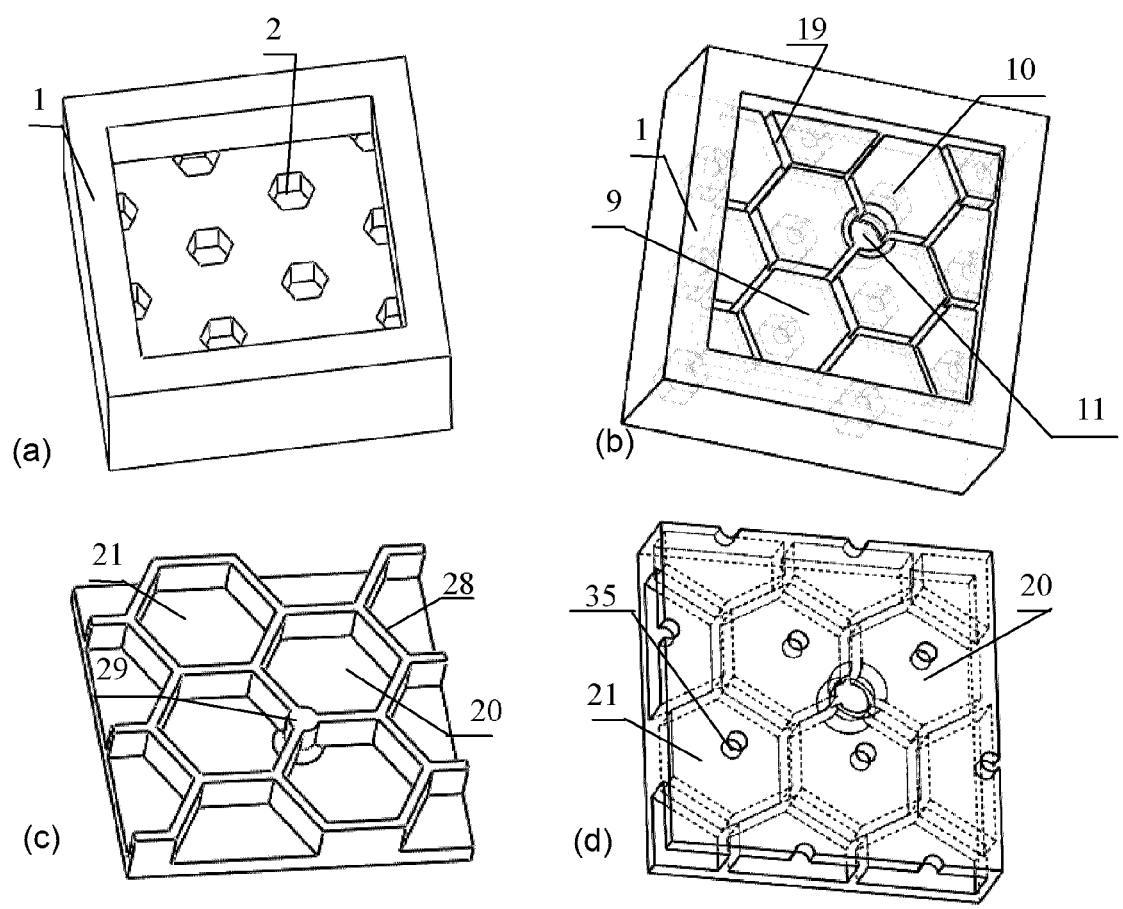
FIG. 19 shows a mold for manufacturing a functional slab by means of the polygonal-grid hollow core slab.

In another implementation method, first the polygonal-grid hollow core slab shown in FIG. 19 can be produced, and then the functional material can be solidified or packed into the slab.

A method for integrally manufacturing polygonal-grid solid core functional slabs with the mold described above, mainly comprising three steps. Step 1 includes manufacturing male molds with an appropriate mold, wherein, the male molds themselves are made of a functional material, and, as a special case, an intermediate material can be used. Step 2 includes assembling the male molds into a female mold, and injecting or adding the material for the skeleton of the solid core functional slab (a liquid or powder material, or a preformed material) into the mold and solidifying the material, so that the material in the cavities below the bottom of the polygonal columns forms the bottom layer of the solid core functional slab, the material in the voids forms the polygonal-grid, the grooves form the linking columns, and the material above the polygonal columns forms the top layer of the solid core functional slab; thus, a polygonal-grid solid core functional slab is produced in an integrated manner. Step 3 includes taking appropriate post-treatment, according to the specific male mold material. If the male molds are made of a functional material, according to the nature of the material, the method of removal of the process columns can be selected from cutting, heating, or drawing. If the male molds are made of intermediate material, the structure can be heated up to initiate all male molds to melt down. Functional material can then be packed into the structure, to obtain a solid core functional slab.

Preferably, if the functional material itself can be produced through an appropriate process and has enough mechanical strength to stably support the male mold, then the material can be produced into a male mold (see FIGS. 9, 10, 12, 13, 14, 16, and 17 for the shape), and then the male mold can be treated by cutting, heating, or drawing to remove the process columns, so as to obtain a solid core functional slab.

In another method, if the functional material can be produced into a spongy form, then the functional material can first be produced into a large flat slab in thickness equal to the height of polygonal columns, and then be cut into integrated male mold blocks as required. In this case, the supporting density should be increased appropriately, and the supporting method shown in FIG. 10(b) can be used.

In another method, for functional material in powder, grain, or colloid form (hereinafter referred to as "dispersed functional material"), the material can be produced into a slab with the mold and method for integrally manufacturing polygonal-grid hollow core slab (Patent Application No.: 2010101100691). The slab can then be treated by heat or vaporization to remove the male mold and a hollow core slab can be obtained (FIG. 18). The pinholes left by the process columns can be removed by packing the dispersed material, resulting in a solid core functional slab.

Preferably, if the material is dispersed material, it can be packed into the polygonal columns of the male mold in advance, in order to manufacture polygonal-grid solid core functional slabs.

As a special case, if the functional material is a liquid material that is non-toxic and difficult to vaporize, then either of the two packing methods described above can be used to manufacture polygonal-grid solid core functional slabs.

For further optimization, a vacuum forming method can be used in the process of manufacturing solid core functional slabs (skeleton), so as to improve the molding efficiency.

For further optimization, a heating or vibration method can be used in the process of manufacturing solid core functional slabs (skeleton), so as to improve the molding efficiency.

As a special case, the method is also applicable to manufacturing solid core functional slabs (skeleton part: hollow core slab) from cement, to expand the application range.

Embodiment 3

Mold Assembled from Basic Male Molds and Manufacture of the Slab

Mold combination: The basic male molds 7 and 8 shown in FIGS. 9(a) and 9(b) are mounted to the positioning holes 6 in FIG. 19(a) as required. As such, the mold for integrally manufacturing regular hexagonal-grid solid core functional slabs shown in FIG. 19(b) can be obtained, wherein, the mold comprises a female mold frame 1 (see item 1 in FIG. 8) and basic male molds 7 and 8 (see FIG. 9), and the male molds are positioned by positioning holes 6. If the male mold 2 is arranged at the edge of the female mold, then it has to be cut appropriately according to the shape of edge. For example, when the male mold is arranged as shown at the top left corner in FIG. 16, only a quarter of the male mold is required.

Production of slab: A slab that contains male molds can be obtained with the method for integrally manufacturing polygonal-grid solid core functional slabs as described above. In the slab, after the clearances 19 shown in FIG. 19(b) have been molded, the clearances 19 then form the honeycomb grids (see item 28 in FIG. 15). The connecting holes 11 shown in FIG. 19(b) form reinforcing columns (see item 29 in FIG. 8) for the honeycomb grids. If the molding material is a mixture of epoxy resin and chopped basalt fibers, then the slab that contains the male molds can be stripped off the female mold, so that a polygonal-grid solid core functional slab, in which the skeleton is made of composite material, can be obtained. In addition, polygonal-grid solid core functional slabs with required functions can be obtained with the following manufacturing methods as appropriate.

Flame retardant slab: If the above-mentioned epoxy resin is heat-resistant epoxy resin and the entire male mold is made of a flame-retardant material, then the positioning columns (see item 13 in FIG. 9) in the male mold can be removed by cutting, in order to obtain a polygonal-grid solid core flame retardant slab. The male mold can be fabricated in either of the two optimized process column and positioning column structures (see FIG. 10). If the paraffin wax bonding method shown in FIG. 10(a) is used, or if the mechanical concave-convex connection method shown in FIG. 10(b) is used, then the process columns 12 and positioning columns 13 can be removed by heating and drawing, respectively. If the paraffin wax bonding method is used, then the heat-resistance temperature of the functional material should be higher than the melting temperature of the paraffin wax.

Figure 15:
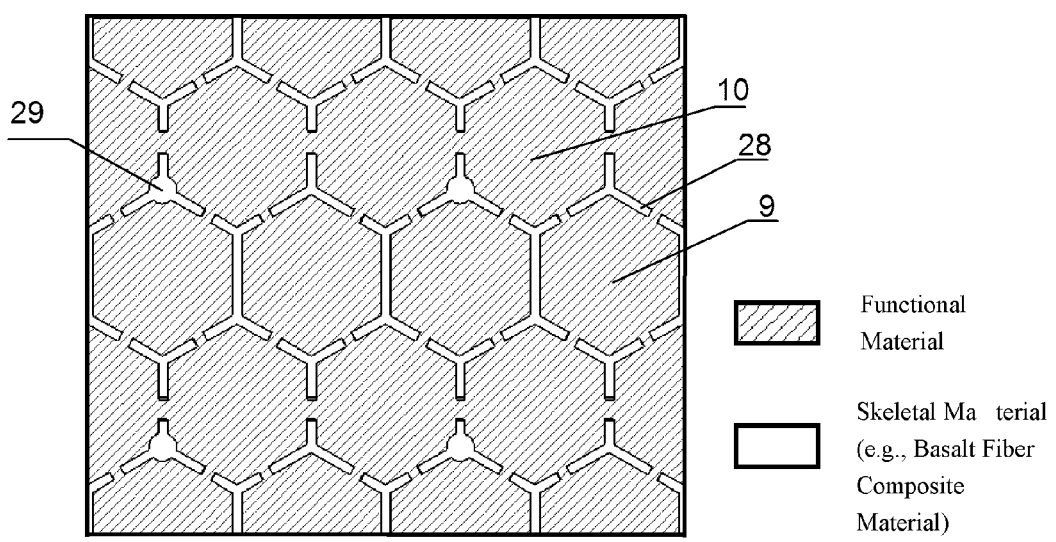
FIG. 15 is a sectional view of the structure of the solid core functional slab manufactured in embodiments 2-4.

Sound insulating slab: If the entire male mold is made of a sound insulating material that can be easily molded, then a polygonal-grid solid sound insulating and flame retardant slab can be manufactured through the procedures described above. The cross sectional structure of a solid core functional slab manufactured in that way is shown in FIG. 15.

Embodiment 4

Arrangement of an Edge-Supported Integrated Male Mold and Manufacture of the Slab Features of the mold: In embodiment 1, each male mold has a process column for supporting and positioning. If the process column is made of a functional material, then it is usually kept in the slab after the slab is manufactured, whereas if the process column is made of paraffin wax, then it will be removed after the slab is manufactured. Sometimes, process columns have more or less effect to the performance of the slab (in some cases, some special effect may be obtained, such as a special visual effect); therefore, the process columns that were originally used for bottom supporting are removed with side supports.

Male mold combination and preparation of male mold: The male mold comprises lower mold, upper mold, and top cover, wherein, the lower mold and upper mold are usually separated from each other at a symmetry plane on the polyhedral column. To produce the male mold, the upper part of the male mold shown in FIG. 12(*d*) can be superposed on the lower part of the male mold (FIG. 12(*c*)), and then the functional material can be injected or added into the mold; next, the material in the mold is solidified and stripped off the mold, so as to obtain the male mold. The height of the male mold can be controlled by controlling the quality of the filled material or by means of a top cover (not shown in the figure). The honeycomb cavities 20 and 21 shown in FIG. 12(*c*) and FIG. 12(*d*), form honeycombs 10 and 9, either with a groove (for forming a reinforcing column) or without a groove as shown in FIG. 12(*a*) and FIG. 12(*b*), respectively; the process column hole 22 and edge support hole 24 shown in FIG. 12(*c*) and FIG. 12(*d*) form the process column 17 and edge support column 18 shown in FIG. 12(*a*) and FIG. 12(*b*), respectively; and the cylinder 23 and honeycomb wall 25 shown in FIG. 12(*c*) and FIG. 12(*d*) form the reinforcing column groove 11 and honeycomb clearance 19 shown in FIG. 12(*a*) and FIG. 12(*b*), respectively. As a result, the integrated male mold shown in FIG. 12(*a*) can be obtained.

Final mold combination and production of slab: The integrated male mold shown in FIG. 12(*a*) (only a quarter is shown in the figure) is placed into the female mold shown in FIG. 11, and then the edge support enclosing piece 16 shown in FIG. 11(*a*) is inserted; as a result, the mold is assembled. Next, the skeletal material (liquid, powder, or preformed material, such as a mixture of resin and chopped basalt fibers) for the solid core functional slab, is injected or added into the mold and then solidified, thus, the cavities below the polygonal columns (9, 10) shown in FIG. 12(*a*) and FIG. 12(*b*) form the bottom layer of the solid core functional slab; the voids shown in FIG. 12(*a*) and FIG. 12(*b*) form the polygonal-grid; the grooves 11 shown in FIG. 12(*a*) and FIG. 12(*b*) form reinforcing columns; and the top surface of the polygonal columns forms the top layer of the solid core functional slab.

As a result, a polygonal-grid solid core functional slab is manufactured in an integrated manner.

Embodiment 5

Arrangement of a Bottom-Supported Integrated Male Mold Block and Manufacture of the Slab Features of the mold: The solution for the problem described in embodiment 2 is to reduce the quantity of supporting and positioning process columns. In this embodiment, an integrated male mold block is prepared by adding cross links between the polygonal columns, removing most bottom supports, and only keeping bottom supports in an essential quantity for stably supporting the male mold.

Male mold combination and preparation of male mold: The approach is essentially the same as that in embodiment 2, with the only difference being that the items 18 related with edge support shown in FIG. 12, are replaced with items 26 related with bottom support shown in FIG. 13(*b*) and FIG. 13(*c*). The upper part of the male mold shown in FIG. 14(*a*) is superposed on the lower part of the male mold shown in FIG. 13(*c*), so as to manufacture the integrated male mold block shown in FIG. 13(*a*) and FIG. 13(*b*).

Final mold combination and manufacture of slab: The integrated male mold block shown in FIG. 13(*a*) and FIG. 13(*b*) (only a quarter of it is shown in the figures) is placed into the female mold shown in FIG. 13(*d*), to obtain the arrangement shown in FIG. 14(*b*). The subsequent procedures are the same as those in embodiment 2. As a result, a polygonal-grid solid core functional slab can be manufactured in an integrated manner. The cross sectional structure of the slab is shown in FIG. 15.

Embodiment 6

Arrangement of Bottom-Supported Integrated Male Mold Block Supported by Three-Leaf Supports and Manufacture of the Slab Features of the mold: On the basis of embodiment 3, another solution for the problem described in embodiment 2 is to remove the bottom supports below the polygonal columns and add three-leaf supports required to stably support the male mold at the reinforcing columns.

Figure 16:
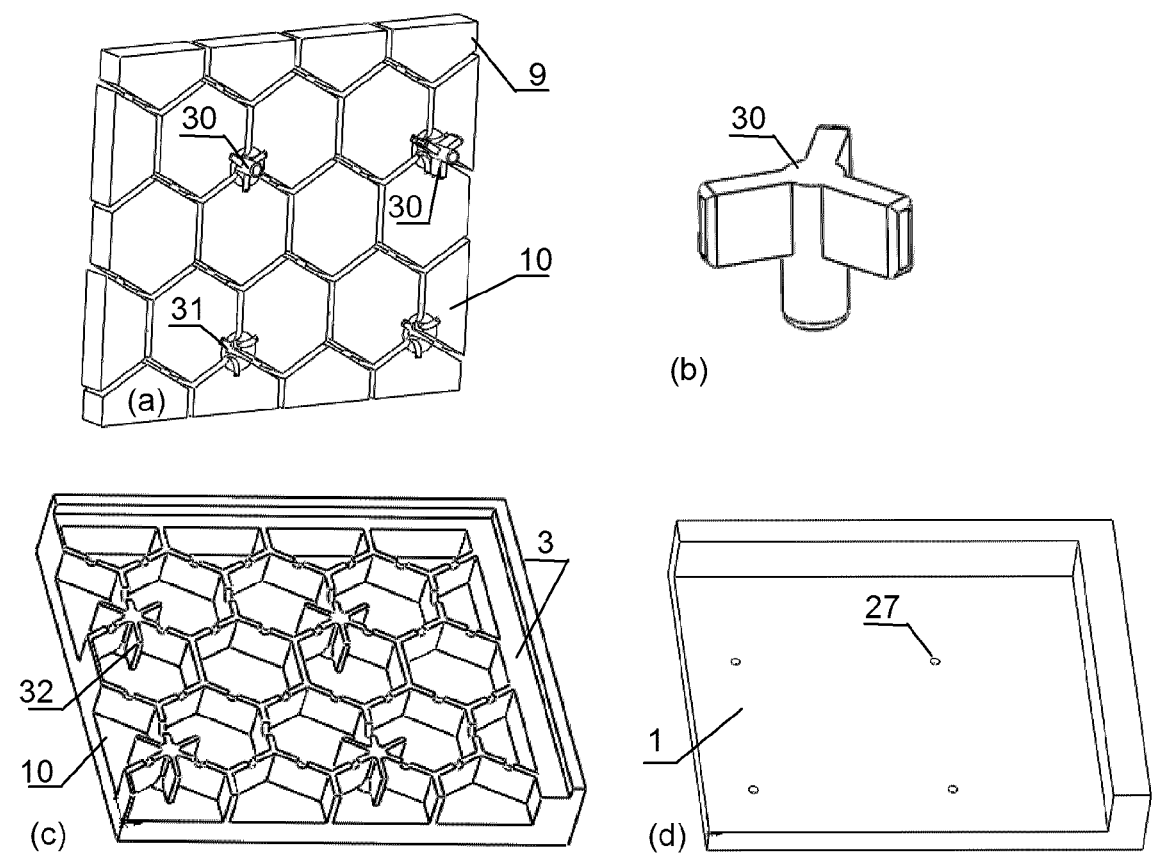
FIG. 16 is a partial structural diagram of an integrated male mold block supported by three-leaf supports on the bottom, and assembled male mold and female mold: (a) perspective bottom view, (b) perspective view of the three-leaf support, (c) perspective view of the male mold, and (d) perspective view of the female mold.

Male mold combination and preparation of male mold: The approach is essentially the same as that in embodiment 3, with the only difference being that the items 26 related with bottom support shown in FIG. 13(*b*) and FIG. 13(*c*) are replaced with items 30 related with three-leaf supports shown in FIG. 16(*a*) and FIG. 16(*b*). The upper part of the male mold shown in FIG. 14(*a*) is superposed on the lower part of the male mold shown in FIG. 16(*c*), so as to manufacture the integrated male mold block as shown in FIG. 16(*a*). In FIG. 16(*a*), item 31 is a support groove in the male mold, and item 30 is the support groove when installed. FIG. 16(*b*) is a perspective view of the three-leaf support. The item 32 in the male mold shown in FIG. 16(*c*) is a rib required for creating the support groove of item 31 shown in FIG. 16(*a*).

Final mold combination and production of slab: After three-leaf supports are mounted for the integrated male mold block as shown in FIG. 16(*a*) (only a quarter is shown in the figure), the male mold block is mounted into the female mold as shown in FIG. 16(*d*), so as to obtain the mold arrangement shown in FIG. 14(*b*). The subsequent procedures are the same as those in embodiment 2. As a result, a polygonal-grid solid core functional slab can be produced in an integrated manner; the cross sectional structure of the slab is shown in FIG. 15.

Embodiment 7

Arrangement of a Mixed Supported Integrated Male Mold Block and Manufacture of the Slab FIG. 17 shows an integrated male mold block that is supported in a mixed manner. The male mold block is supported both at the edges and on the bottom. The male mold can be implemented and the slab can be manufactured with reference to the description in embodiments 1-4.

Embodiment 8

Packing

Features of the mold: The mold is applicable to functional materials that are difficult to mold. In this embodiment, an appropriate polygonal-grid hollow functional slab is manufactured first as a skeleton, and then the slab is packed.

Mold combination: The mold combination shown in FIG. 19 is used.

Preparation of slab: The slab can be prepared with either of the following methods. In method 1, first an appropriate functional material is filled into a hollow container shown in FIG. 18, and the method is followed as described in embodiment 1. The material for producing polygonal columns should be close to the functional material as much as possible in terms of properties; in other words, an appropriate material should be selected to minimize the adverse effect to the functionality of the functional material. In method 2, a hollow core slab is prepared as the skeleton for a solid core slab, as shown in FIG. 19; a functional material is packed into the hollow core slab directly; and then the packed hollow core slab is treated by thermosetting or closing the process holes 35 as shown in FIG. 19(d).

Alternatively, integrated male mold blocks packed with a functional material can be produced first, with reference to embodiments 1-5. Then, the subsequent procedures as described in embodiments 1-5 can be performed.

Embodiment 9

Production of Slabs with Curved or Spherical Surfaces

Though the present invention is described and exemplified in production of slabs with flat surfaces, the mold and method disclosed in the present invention can also be used to produce slabs with curved or spherical surfaces.

What is claimed is:

1. A mold for integrally manufacturing polygonal-grid hollow core slabs, comprising:
    a female mold defining a plurality of positioning holes; and
    a plurality of male molds arranged on the female mold, each of the male molds comprising:
        a polygonal column capable of melting, dissolving, or vaporizing;
        a positioning column inserted into one of the positioning holes in the female mold; and
        a linking column arranged between the polygonal column and the positioning column, one end of the linking column being connected to the polygonal column, and the other end of the linking column being connected to the positioning column, wherein:
    a clearance exists between at least one pair of adjacent polygonal columns;
    the polygonal columns are made of paraffin wax;
    the polygonal columns are regular hexagonal prisms;
    circumcircles of cross sections of the positioning columns, linking columns, and polygonal columns are concentric; and
    arc grooves are arranged on at least one edge of at least one polygonal column.

2. The mold for integrally manufacturing polygonal-grid hollow core slabs according to claim 1, further comprising:
    a backing plate arranged on a bottom frame of the female mold; and
    a top cover arranged above the female mold, wherein; and
    both a top surface of the backing plate and a bottom surface of the top cover are curved surfaces.

3. The mold for integrally manufacturing polygonal-grid hollow core slabs according to claim 1, wherein, the arc grooves are arranged on the edges of three adjacent polygonal columns, and the three arc grooves are assembled together to form a round hole.

4. The mold for integrally manufacturing polygonal-grid hollow core slabs according to claim 1, wherein, the male molds are aligned into an array in the female mold.

5. A method for integrally manufacturing polygonal-grid hollow core slabs with the mold as described in claim 1, comprising:
    injecting or adding a raw material of the hollow core slabs into the mold and solidifying the raw material in the mold, wherein cavities defined between the linking columns form a bottom layer of the hollow core slab, the clearances form the polygonal-grid, and a top surface of the polygonal columns form a top layer of the hollow core slab; and
    removing the male molds from the hollow core slab by heat, vaporization, or adding a dissolving solution.

6. A method for integrally manufacturing polygonal-grid hollow core slabs with the mold as described in claim 3, comprising:
    injecting or adding a raw material of the hollow core slabs into the mold and solidifying the raw material in the mold, wherein cavities defined between the linking columns form a bottom layer of the hollow core slab, the clearances form the polygonal-grid, and a top surface of the polygonal columns form a top layer of the hollow core slab; and
    removing the male molds from the hollow core slab by heat, vaporization, or adding a dissolving solution.

7. A method for integrally manufacturing polygonal-grid hollow core slabs with the mold as described in claim 4, comprising:
    injecting or adding a raw material of the hollow core slabs into the mold and solidifying the raw material in the mold, wherein cavities defined between the linking columns form a bottom layer of the hollow core slab, the clearances form the polygonal-grid, and a top surface of the polygonal columns form a top layer of the hollow core slab; and
    removing the male molds from the hollow core slab by heat, vaporization, or adding a dissolving solution.

* * * * *